US005276441A

United States Patent [19]

Katsurada et al.

[11] Patent Number: 5,276,441
[45] Date of Patent: Jan. 4, 1994

[54] COMMUNICATION CHARGE MANAGEABLE DIGITAL COMMUNICATION UNIT AND A METHOD OF MANAGING COMMUNICATION CHARGE

[75] Inventors: Morihiro Katsurada; Sadaaki Shimonaga, both of Nara, Japan

[73] Assignee: Sharp Kabushiki Kaisha, Osaka, Japan

[21] Appl. No.: 823,040

[22] Filed: Jan. 14, 1992

Related U.S. Application Data

[63] Continuation of Ser. No. 549,479, Jul. 6, 1990, abandoned.

[30] Foreign Application Priority Data

Jul. 8, 1989 [JP] Japan ............................. 1-176661
Jul. 8, 1989 [JP] Japan ............................. 1-176662
Jul. 13, 1989 [JP] Japan ............................. 1-181984

[51] Int. Cl.⁵ ............................................. H04Q 1/00
[52] U.S. Cl. ............................. 340/825.03; 340/825.52; 379/119; 379/130
[58] Field of Search .......... 340/825.03, 825.52, 340/825.02, 825.35; 379/118, 119, 120, 130; 364/705.06

[56] References Cited

U.S. PATENT DOCUMENTS

| 3,320,866 | 5/1967 | Plummer | 379/119 |
|---|---|---|---|
| 4,071,908 | 1/1978 | Brophy et al. | 340/825.02 |
| 4,249,163 | 2/1981 | Maurer et al. | 340/825.3 |
| 4,525,601 | 6/1985 | Barnich et al. | 379/119 |
| 4,585,904 | 4/1986 | Mincone et al. | 579/119 |
| 4,621,334 | 11/1986 | Garcia | 340/825.3 |
| 4,788,719 | 11/1988 | Gupta | 379/130 |
| 4,813,065 | 3/1989 | Segala | 379/120 |
| 5,146,491 | 9/1992 | Silver | 379/130 |

FOREIGN PATENT DOCUMENTS

| 0255169 | 3/1988 | European Pat. Off. . |
|---|---|---|
| 0313313 | 4/1989 | European Pat. Off. . |
| 3716141A1 | 12/1988 | Fed. Rep. of Germany . |
| 57-25763 | 2/1982 | Japan . |
| 2128451A | 4/1984 | United Kingdom . |

Primary Examiner—Donald J. Yusko
Assistant Examiner—Brian Zimmerman
Attorney, Agent, or Firm—David G. Conlin; Henry D. Pahl, Jr.

[57] ABSTRACT

A communication charge management unit of a communication unit in the Integrated Services Digital Network comprises a memory (11; 21; 41) for storing the communication charge for each of plurality of identification information. The identification information is one of or a combination of user identification information specifying the user of the communication unit, a sub address specifying each of the plurality of terminal units which the communication unit includes, and communication mode identification information specifying each of the plurality of communication modes of the communication unit. The management unit comprises a control accumulating unit (7; 27; 43) updating the corresponding communication charge stored in the memory, in response to the identification information generated at the time of calling by the communication unit and the communication charge information transmitted from a center at the time of communication termination. This control accumulating unit updates the memory contents by adding the current transmitted communication charge to the communication charge stored in the memory.

7 Claims, 9 Drawing Sheets

| SUB ADDRESS | COMM. CHARGE |
|---|---|
|  |  |

| TYPE OF COMM. MODE | COMM. CHARGE |
|---|---|
| G 4 | . . . |
| G 3 | . . . |
| TELEPHONE | . . . |
| . | . |
| . | . |
| . | . |

COMMUNICATION CHARGE MANAGEABLE DIGITAL COMMUNICATION UNIT AND A METHOD OF MANAGING COMMUNICATION CHARGE

This is a continuation of copending application Ser. No. 07/549,479, filed on Jul. 6, 1990 now abandoned.

BACKGROUND OF THE INVENTION

1. Field of the Invention

The invention relates generally to digital communication units, and more particularly, to a unit and method for managing the communication charge of communication units that carry out digital communication using the Integrated Services Digital Network (ISDN) line.

2. Description of Background Art

Various non-telephone in-house equipments such as facsimile machines and personal computers, in addition to telephone sets, are being connected to common subscriber line widely used in the progress in the tele-communication technology.

Meanwhile, digitalization in transmission media and branch exchangers is advanced in accordance with the development of digital technology.

Under such circumstances, a digital communication network called ISDN is being developed to provide various services of telephones and non-telephones integratedly by a digital network that couples various digital equipments. ISDN is appreciated to be a service network "comprising functions for providing digital connection between users and the network interface" in the description hereinafter.

In the case of telecommunication using a digital communication network such as ISDN, details of the transmitting destination, the transmitting date and time, the transmitting time period, etc. are recorded by a center every subscriber line. However, only the communication charge is notified to an user at the end of communication so that the user is only aware of the communication charge of that time. The details of the communication charge on a month basis is reported to the user in the form of a bill from the telecommunication company. These details do not include the classification of in-house terminals, individual users, and communication modes.

In general, the terminal units such as telephone sets and facsimile machines connected to one subscriber line are utilized commonly by many people in the digital communication network. Also, a plurality of terminal equipments including telephone sets and facsimile machines are connected to one subscriber line generally.

In conventional communication network charge management system, an user could not identify the communication charge in an individual basis or a terminal equipment basis, so tracking of details concerning the usage of the terminal equipments was impossible.

In the digital communication network, the communication charge differs depending upon the communication mode, such as communication by telephone, and by G3 mode or G4 mode of the facsimile. However, the user could not track the communication charge independently and separately for respective communication modes in conventional communication network.

A unit for monitoring the communication charge on an ID code basis by specifying the user by an ID code is disclosed in Japanese Patent Laying-Open No. 57-25763. This charge management unit of the prior art comprises a unit that switches a terminal equipment into an usable state in response to application of a registered ID code, a unit that calculates the communication rate or the communication charge on a fixed time period basis that corresponds to the communicating destination in response to the commencement of a communication, a memory for storing communication charge or communication rate for each ID code, and an unit for writing accumulatively the calculated communication charge or the communication rate into the memory region corresponding to the current ID code.

SUMMARY OF THE INVENTION

An object of the invention is to provide a communication unit capable of tracking the details of usage of a communication unit efficiently.

Another object of the invention is to provide a communication unit capable of managing the communication charge efficiently.

A further object of the invention is to provide a communication unit capable of managing the communication charges of the communication units connected to one subscriber line for each ID code that specifies an user.

A still further object of the invention is to provide a communication unit capable of managing the communication charge of a communication unit having a plurality of communication terminals connected to one line on a communication terminal basis.

Another object of the present invention is to provide a communication unit capable of managing the communication charge of a communication unit that can communicate under a plurality of communication modes on a communication mode basis.

A still further object of the present invention is to provide a communication charge management method capable of managing communication charge efficiently.

The communication unit in accordance with the present invention comprises a memory for storing the communication charge for each of the plurality of identification information.

The communication unit comprises a unit for updating the communication charge corresponding to the generated identification information in the memory, in response to the identification information generated at the time of calling and the communication charge information transmitted via a digital subscriber line at the time of communication termination. This update unit updates only the communication charge corresponding to the generated identification information by adding the current transmitted communication charge to the associated communication charge stored in the memory.

A plurality of identification information comprises user specification information of the communication unit, a sub address for identifying each of the plurality of terminal units included in the communication unit, or information identifying each of the plurality of communication modes of the communication unit.

This organization enables the management of the communication charge on an user or user's section basis, a terminal unit basis, or a communication mode basis, for implementing an efficient communication charge management system of the communication unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention will be described using a communication terminal of ISDN as an example.

Figure 1:
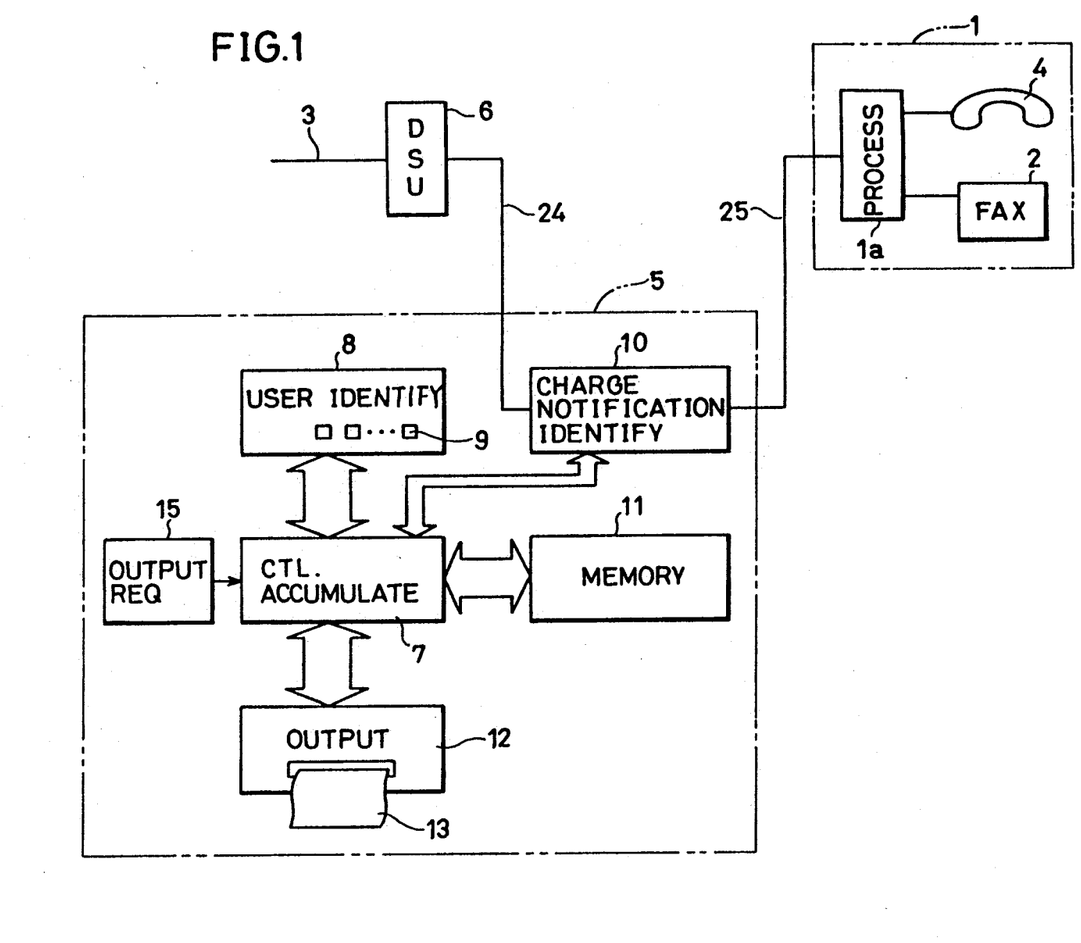
FIG. 1 shows a schematic structure of the whole communication unit in accordance with one embodiment of the present invention.

FIG. 1 schematically shows the structure of the communication unit in accordance with a first embodiment of the invention. Referring to FIG. 1, the communication unit comprises a communication terminal 1, and a charge management unit 5 for managing the communication charge of communication unit 1.

The communication terminal 1 comprises a hand set 4 functioning as a telephone set, a facsimile unit 2 for facsimile communication, and a processing circuit 1a for connecting either facsimile unit 2 or hand set 4 to line 3. The facsimile unit 2 comprises the function to commence communication in response to a transmission request to a destination, or a transmission acknowledge from a destination.

The processing circuit 1a connects either facsimile unit 2 or hand set 4 to line 3 by a terminal specification information (sub address) from a source at the time of reception. At the time of transmission, processing circuit 1a connects either hand set 4 or facsimile unit 2 to line 3 by an off-hook signal from hand set 4 or a transmission request signal from facsimile unit 2.

The charge management unit 5 comprises an user identification circuit 8 for generating identification information for identifying the user, a charge notification identification circuit 10 for detecting the communication charge information transmitted from a center (not shown) at the time of communication termination, a control accumulating circuit 7 for accumulatively writing the communication charge in a predetermined region of a memory 11 in accordance with the user identification information from user identification circuit 8 and the communication charge information from communication notification identification circuit 10. The control accumulating circuit 7 comprises the function to read out the communication charge corresponding to the identification information from memory 11 to an output unit 12 in response to an output request from an output request circuit 15. The control accumulating circuit 7 is implemented by a microcomputer, for example.

The user identification circuit 8 comprises ten keys 9. The ten key 9 comprises a plurality of keys of numerals 0–9, for example. By operating ten key 9, identification information formed by a plurality of digits of a password, or a plurality of digits of numbers or characters called cipher number is applied.

The user identification circuit 8 may comprise a card reader as an identification information input unit. In this case, an user inputs identification information by inserting into the card reader a personal card that is a magnetic media having the identification information recorded thereon, or an IC (integrated circuit) card having the identification information recorded in a semiconductor memory.

The memory 11 comprises a first memory region formed of a ROM (Read Only Memory), for example, for storing a plurality of identification information, and a second memory region (refer to FIG. 2) formed of a RAM (Random Access Memory), for example, for storing the communication charge for each identification information.

The output circuit 12 is formed of a printer for example, to print out a communication charge from the control accumulating circuit 7, as well as the identification information, on a recording paper. The output circuit 12 may be a visual display unit using a liquid crystal display element or a CRT (Cathode Ray Tube), or a speech synthesizing output unit that carries out speech output.

The charge management unit 5 is connected to ISDN line (digital communication line) 3 via a digital service unit (DSU) 6. The digital service unit 6 is a terminator of ISDN line 3, which performs signal conversion, confirmation of communication, control of transmission and operation procedure, and detection/correction of transmission error.

Figure 3:
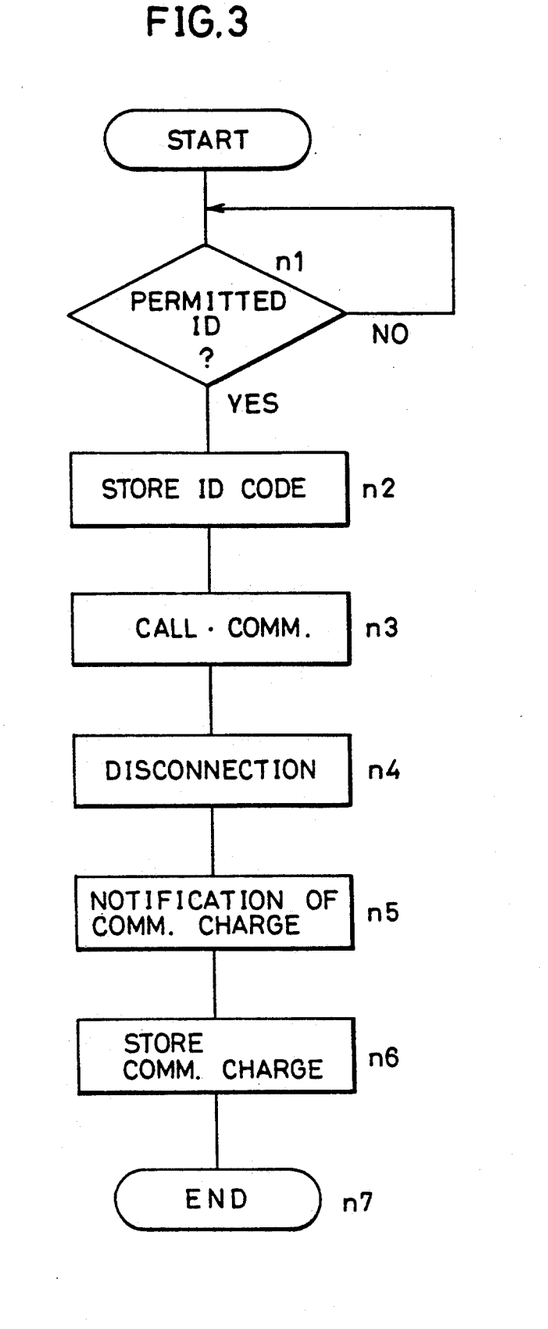
FIG. 3 is a flow diagram showing the operation of the unit of FIG. 1.

Referring to FIG. 3, the operation of facsimile communication is described.

The user inputs identification information that specifies himself/herself or his/her own group into user identification unit 9 by operating the ten key 9. The user identification unit 9 transmits the input identification information to control accumulating unit 7.

Figure 2:
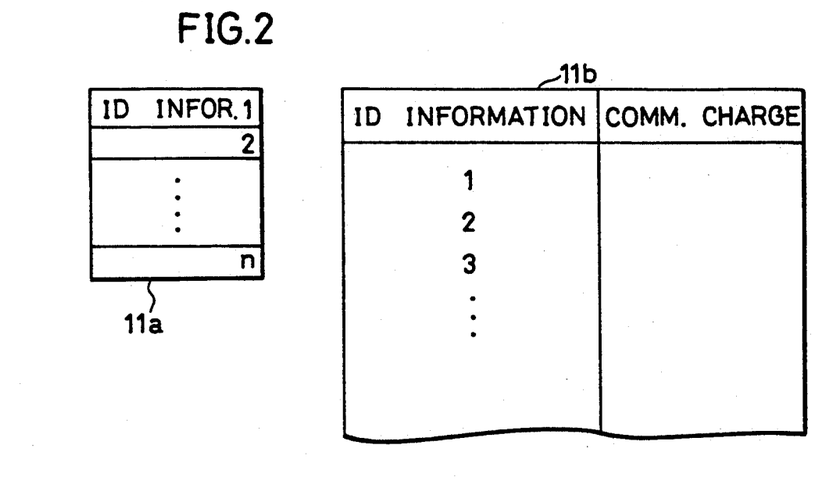
FIG. 2 is an example of the stored contents of the memory of FIG. 1.

The control accumulating unit 7 makes a determination as to whether the identification information corresponding to the applied identification information is stored in the first memory region 11a or not (step n2). As shown in FIG. 2, a plurality of identification information are previously stored in the first memory region 11a of memory 11. This first memory region 11a may be formed of a ROM, as mentioned before, or a content addressable memory.

When identification information that coincides with the input identification information is not detected, control accumulating unit 7 sends a non-coincidence detection signal to user identification circuit 8. The user identification circuit 8 displays the error in response to the non-coincidence detection signal for having the user reenter the identification information.

When coincidence is detected at step n1, control accumulating unit 7 stores the identification information into a temporary storage device, such as a register not shown. Thus, a ready state is established for storing the communication charge in a memory region corresponding to the applied identification information.

The user then operates facsimile unit 2 to make a call and communicate with the facsimile unit. The facsimile communication is carried out via processing circuit 1a, charge notification identification circuit 10, DSU 6, and ISDN line 3 (step n3).

The charge notification identification circuit 10 only monitors the communication contents and does not affect the facsimile communication in any way.

When facsimile communication terminates, terminal 1 is disconnected from ISDN line 3 under the control of processing circuit 1a (step n4).

Figure 4:
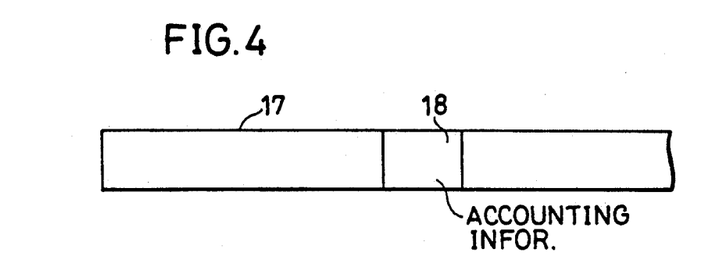
FIG. 4 shows an organization of the communication charge information transmitted via the ISDN line at the time of communication termination.

Next, communication charge information is applied to charge notification identification circuit 10 via ISDN line 3 and DSU 6 from the center (step n5). This communication charge information 17 comprises accounting information 18, as shown in FIG. 4, including a code indicating that it is the communication charge, in addition to the communication charge information.

The charge notification identification circuit 10 detects from the communication charge information 17 this accounting information 18, and applies the same to control accumulating circuit 7. The control accumulating circuit 7 reads the corresponding communication charge from the second memory region 11b of memory 11 and adds the same with the communication charge applied from identification circuit 10. This accumulated information is written into the original memory location (step n6).

The communication charge to be added may be read out from the second memory region 11b and stored simultaneously into a register at the time when identification information is temporarily stored in the register.

A communication network may be employed where the communication charge information is not returned to the calling side every time the communication terminates, but transmitted to the calling side from the center at the time of communication termination in response to a communication charge notification request from the calling side. In this case, the calling side transmits a charge notification request signal at the time of calling.

Figure 5:
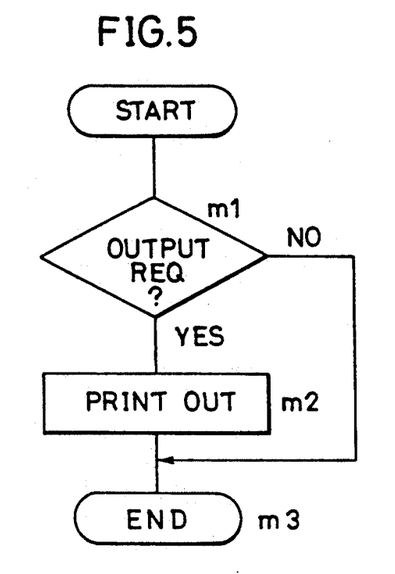
FIG. 5 is a flow diagram showing the operation of the unit of FIG. 1 at the time of reading out the memory contents.

Next, the operation of the user or the line administrator in reading out the communication charge from the memory 11 is described with reference to FIG. 5.

By operating an output request unit 15, an output request signal is generated (step m1). The output request unit 15 may be a switch that generates a signal of a level different from the normal state level when turned on.

The control accumulating unit 7 accesses memory 11 in response to this output request signal to read out the contents of the second memory region 11b along with the identification information, and applies the same to output unit 12. The output unit 12 prints out the read out information sequentially to recording paper 13 (step m3).

The administrator may track the communication charge for each identification information (by each individual or by each section) from the printed out information to accurately monitor the communication charge of each section or individual.

The identification information may be decoded prior to the print out so as to display a corresponding specific name along with the identification information.

Furthermore, the communication charges of only the required identification information may be displayed.

Although the operation in which a plurality of users utilize one terminal has been described in the above mentioned embodiment, there are many systems in which a plurality of terminals are connected in the bus-type or the star-type to one ISDN line. In the case of such multiple terminal configuration, it is possible to manage the communication charge for each terminal.

Figure 6:
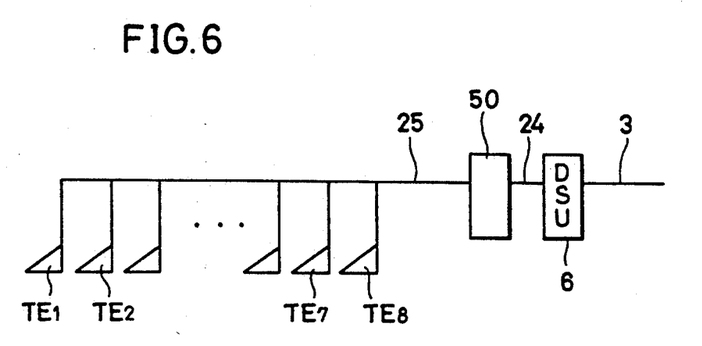
FIG. 6 shows the schematic structure of a communication unit in accordance with another embodiment of the present invention.

FIG. 6 shows an user-network interface configuration where a plurality of terminals TE1-TE8 (a maximum of eight in the shown embodiment) are multipoint-connected to line 25. A charge management unit 15 is disposed between bus line 25 and line 24. Line 24 couples charge management unit 15 with DSU 6.

The terminals TE1-TE8 may be facsimile units, telephone sets, or personal computers comprising communication functions.

Figure 7:
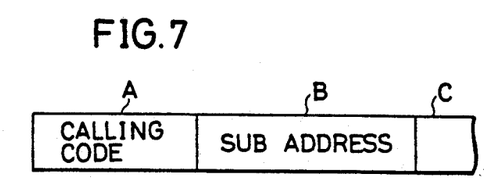
FIG. 7 schematically shows the organization of the access request signal (calling information) generated at the time of calling.

In the case of the interface configuration of FIG. 6, the identification information shown in FIG. 7 is transmitted to identify the calling terminal. In FIG. 7, the identification information comprises a calling code field A for specifying the line of the calling side, a sub address field B for specifying either of the terminals TE1-TE8, and an information field C including various control information and transmission information. The organization of the identification information is called the coding system. The identification information is generated by processing circuit 1a to be transmitted to line 25 in response to the access request terminal unit at the time of calling.

Different sub addresses (codes) are allotted to each of terminals TE1-TE8 in advance.

In the data communication network, the calling side identification information of FIG. 7 is sent along with the response side identification information, at the time of calling. This identification information field is positioned in a specific region of a message format as an address field. Therefore, communication charge management of each sub address, i.e. for each terminal, is possible by detecting the transmitted sub address at the time of calling.

Figure 8:
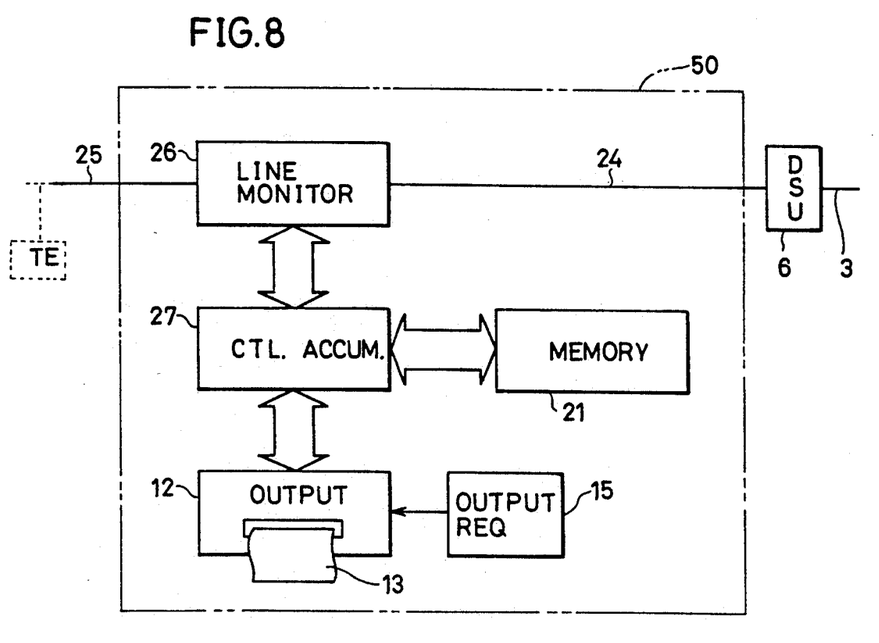
FIG. 8 specifically shows the structure of the charge management unit of FIG. 6.

FIG. 8 shows the structure of the unit that manages the communication charge by the sub address. Referring to FIG. 8, the charge management unit 50 comprises a line manager 26 for monitoring communication information transmitted to lines 24 and 25, a control accumulating unit 27 coupled to line monitor 26, a memory 21 coupled to control accumulating unit 27, and an output circuit 12.

Line monitor 26 detects and monitors the electrical signals of S point (definition point) of the basic interface. S point is one of the reference points of user-network interface, in which a standardized interface configuration is employed with respect to this reference point. S point is the connection point between in-house control unit that performs switching selection and protocol processing and the in-house terminal equipments.

Line monitor 26 detects the sub address of the calling and the communication charge information transmitted from the center via ISDN line 3 at the time of communication termination, and applies the same to control accumulating unit 27.

The control accumulating unit 27 is formed of a microcomputer for example, to store the communication charge of line monitor 26 into a memory region corresponding to the sub address of memory 21.

Figure 9:
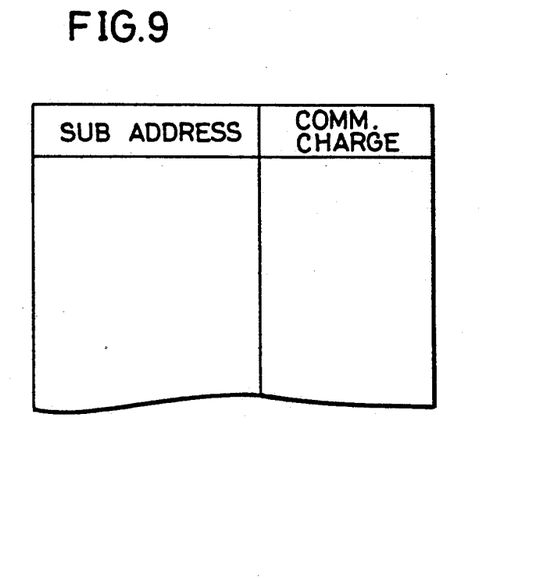
FIG. 9 schematically shows the stored contents of the memory of FIG. 8.

Memory 21 has a memory region for storing the communication charge for each of the sub addresses of terminals TE1-TE8, as shown in FIG. 9. Memory 21 is formed of a RAM, for example.

The output circuit 12 is likewise to that shown in FIG. 1. The operation thereof will be described referring to the operation flow diagram of FIG. 10.

Figure 10:
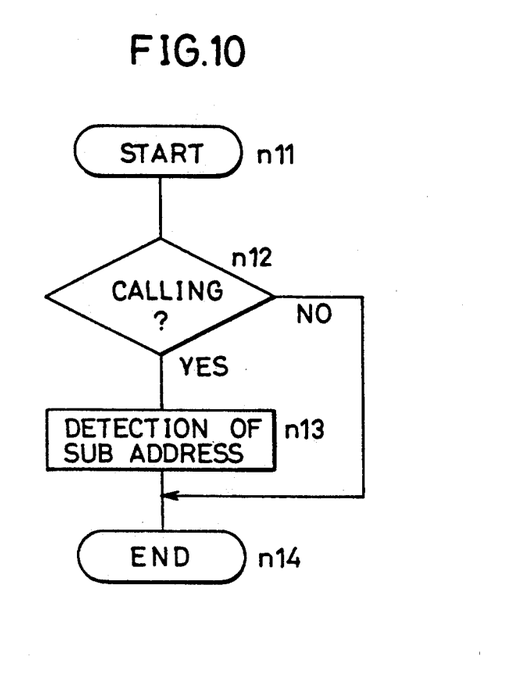
FIG. 10 is a flow diagram showing the operation of the unit of FIG. 9 at the time of calling.

For communication, one of the terminals TE1-TE8 executes the calling. The calling information comprises information indicating that it is a call, receiving destination specification information, and calling side specification information as shown in FIG. 7. This calling information is transmitted to ISDN line 3 via line 25, line monitor 26, line 24, and DSU 6.

Line monitor 26 monitors the information transmitted from line 25 to make a determination as to whether the calling information is transmitted or not (step n12).

When line monitor 26 detects the calling information, the sub address is extracted therefrom to be applied to control accumulating unit 27 (step n13).

When control accumulating unit 27 receives the sub address information, it enters a ready state for updating the original content by adding the communication charge to the stored content of the memory region corresponding to the sub address. In this ready operation, control accumulating unit 27 may store the sub address in a register and read out the content of the corresponding memory region of memory 21, and store the read out communication charge into the register. Under this state, control accumulating unit 27 waits for the communication charge to be transmitted after the communication termination.

Figure 11:
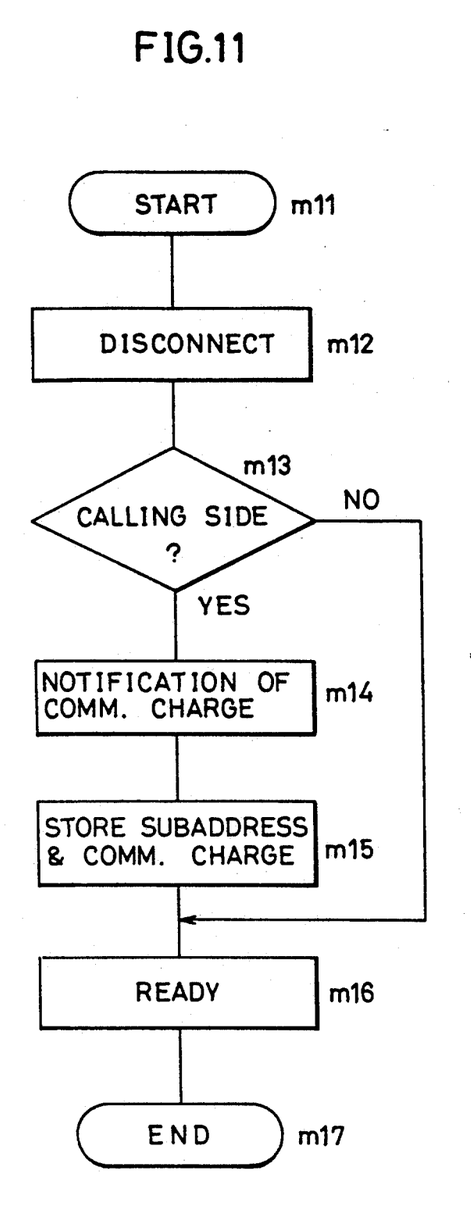
FIG. 11 is a flow diagram showing the operation of the unit of FIG. 9 at the time of updating the communication charge.

The operation after communication termination is described with reference to FIG. 11.

When communication by a terminal unit is completed, lines 25 and 24 are turned to a "disconnected" state (step m12). The termination of the communication is detected by the line monitor 26 detecting the "disconnected" state of the line.

Line monitor 26 makes the determination on whether this line "disconnection" is carried out by the calling side, or the responsive side (step m13). This determination is detected depending upon whether the line "disconnection" is generated at the line 25 side or the ISDN line side.

When the line of the calling side is turned to a "disconnected" state, the communication charge is sent from the center via ISDN line 3. Line monitor 26 detects this communication charge information and applies the same to control accumulating unit 27. Control accumulating unit 27 adds the applied communication charge to the original communication charge of the corresponding sub address, and writes the added result into a memory region corresponding to the sub address (step m15). Thus, the communication charge charged by the communication of the terminal equipment is accumulated and updated. The charge management unit 15 then turns to a receiving state and waits for a new call.

The readout of the stored contents of memory 21 is performed similar to that in management unit 5 of FIG. 1, where the contents of memory 21 read out through control accumulating circuit 27 are printed out on recording paper 13, by the operation of output request circuit 15. The printed out information includes the sub addresses and the communication charge of the corresponding sub address. The communication charge of only the desired sub address, or all the sub addresses may be printed out at the time of print out. The name of the terminal unit corresponding to the sub address ("facsimile unit A", for example) may also be printed out.

Figure 12:
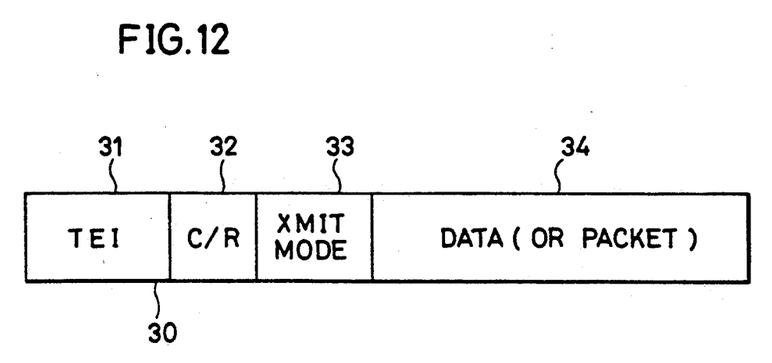
FIG. 12 schematically shows the organization of the calling information including the communication mode specification information generated at the time of calling by a communication unit that is capable of communication under a plurality of communication modes.

At the time of communication, signals as shown in FIG. 12 are generally transmitted, whereupon the identification of the calling and the response is carried out, in addition to the identification of the communication channel according to the communication mode. In FIG. 12, signal 30 comprises a terminal end point identifier (TE1) field 31 for identifying the calling and the responding, a call/response field 32 for identifying the transmission and the reception mode, a transmission mode field 33 for identifying the used transmission mode (channel), and a communication information field 34.

In ISDN communication line, channels having different data transmission rate are provided. For efficient communication, a channel is selected in accordance with the communication mode of the terminal unit. This channel selection and adjustment between the data transmission rate of a channel and that of the terminal unit is performed by the network.

The communication charge differs for each communication mode. By managing the communication charge for each communication mode, the usage of the terminal may be accurately tracked to achieve efficient communication charge management.

Figure 13:
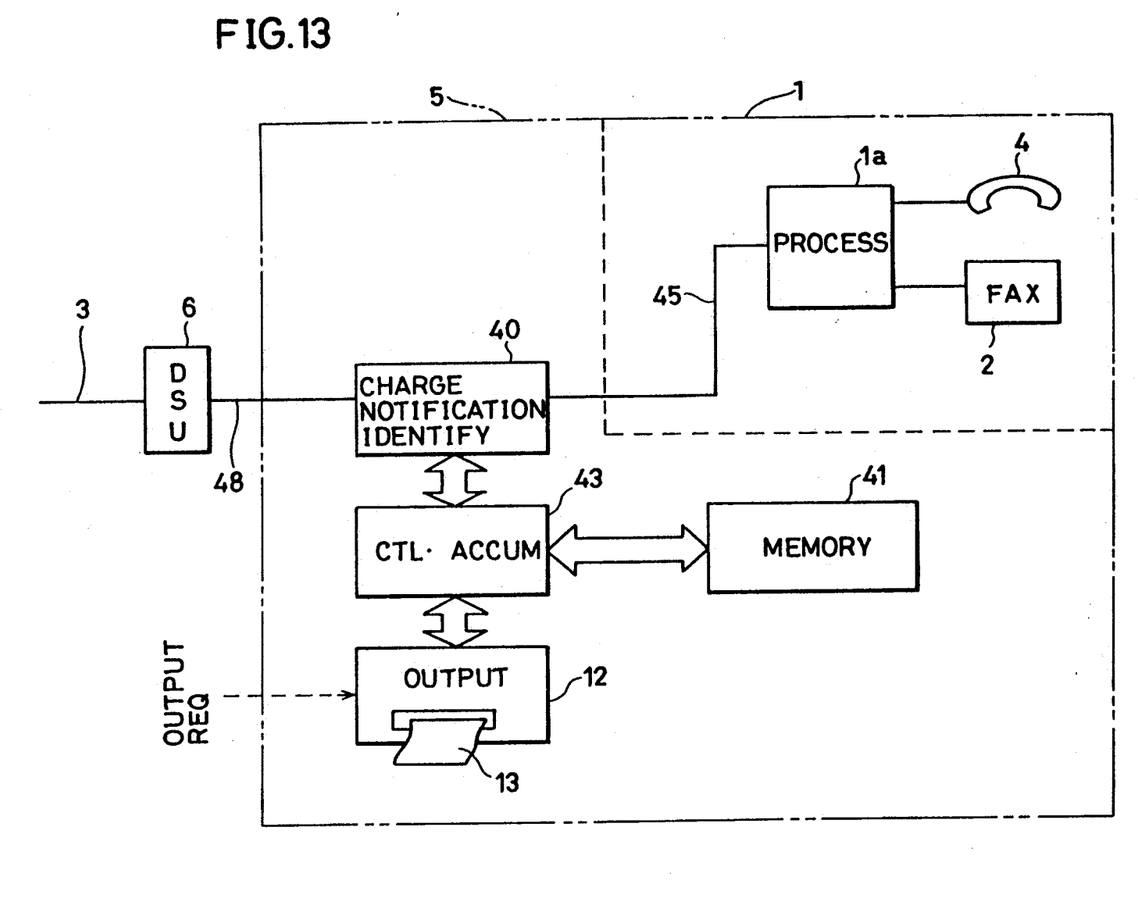
FIG. 13 shows the structure of a unit for managing communication charge for each communication mode.

FIG. 13 shows the structure of a unit for managing communication charge for each communication mode.

The terminal 1 comprises a facsimile unit 2, a hand set 4, and a processing circuit 1a. The hand set 4 has the function of a telephone set that carries out speech communication. The facsimile unit 2 is capable of communication by the G3 mode and the G4 mode. The communication circuit 1a previously stores the communication mode by each terminal unit to add the communication mode specification information corresponding to the calling terminal unit into the calling information. This is transmitted to line 45.

The charge notification identification unit 40 monitors the information on lines 45 and 48 to detect the communication mode specification information at the time of calling and the communication charge information at the time of communication termination.

The control accumulating unit 43 updates the stored contents of memory 41 in response to the communication mode specification information and communication charge information from charge notification identification unit 40.

Figure 14:
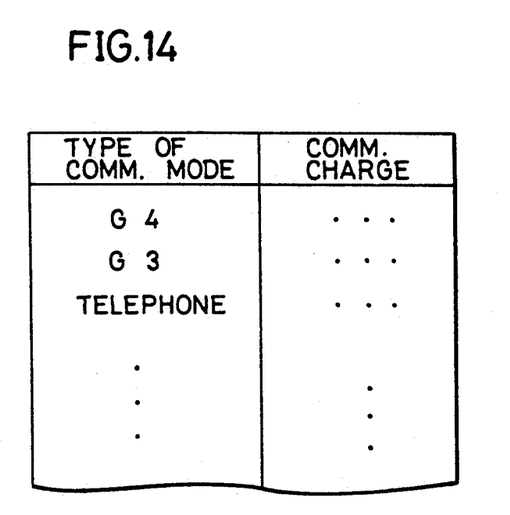
FIG. 14 schematically shows the management of the communication charge in accordance with another embodiment of the invention.

Memory 41 has a region that stores the communication charge for each communication mode, as shown in FIG. 14. Though the G4, G3 modes and the telephone mode are typically displayed as the communication mode in FIG. 14, the items of the communication mode is changeable corresponding to the type of the communication units.

The output unit 12 is likewise to that in FIG. 1, and is a printer, a visual display unit, or a speech synthesizing output unit. The operation will be described with reference to the flow chart of FIG. 15.

Figure 15:
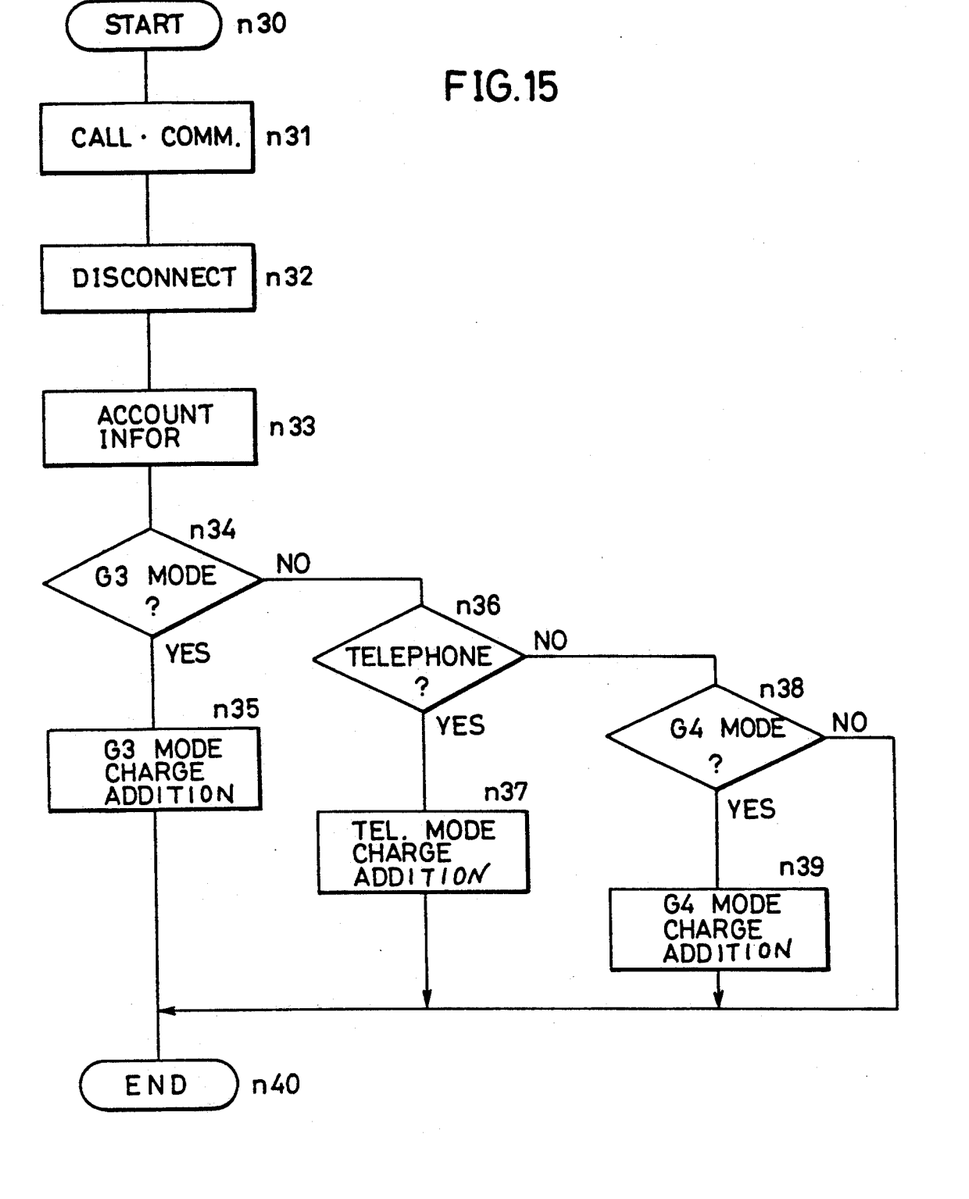
FIG. 15 schematically shows an operation flow of the communication unit in accordance with another embodiment of the present invention.

For communication by terminal 1, either the facsimile unit 2 or hand set 4 is brought to an operational state. When facsimile unit 2 is in an operational state, the communication mode (G3, G4) is established at the same time. Although a unit that is capable of communication under both the G3 mode and the G4 mode is assumed for facsimile unit 2, a facsimile unit that is capable of communication only by the G4 mode or the G3 mode may be employed.

The processing circuit 1a adds the corresponding communication mode specification information to the calling information in response to the calling request from facsimile unit 2 or hand set 4. This information is transmitted to line 3 via line 45, charge notification identification unit 40, line 48 and DSU 6.

The charge notification identification unit 40 detects the communication mode specification information from the calling information transmitted via line 45, and applies the same to control accumulating unit 43. The control accumulating unit 43 temporarily stores the applied communication mode specification information into a register for example, and enters a communication charge update ready state (step n31).

When the communication by the terminal unit is completed, line 45 is turned to a "disconnected" state (step n32). After this "disconnection", that is to say, after the communication by the terminal unit is completed, the communication charge information is transmitted from the center to line 48 via line 3 and DSU 6 (step n33).

The charge notification identification unit 40 detects this communication charge information and applies the same to control accumulating unit 43. The control accumulating unit 43 updates the communication charge of the corresponding region of memory 41 in accordance with the previously applied communication mode specification information.

When the previously applied communication mode specification information specifies the G3 mode (step n34), a new communication charge is added to the communication charge in the memory region corresponding to the G3 mode of the memory 41, and the added result is restored into the original location, i.e., the memory region corresponding to the G3 mode (step n35).

When the previously applied communication mode specification information specifies a telephone communication mode (step n36), the control accumulating unit 43 reads out the communication charge from the memory region corresponding to telephone communication mode of memory 41. A new communication charge is added to this read out communication charge, to be written into the original memory region (step n37).

When the previously applied communication mode specification information shows the G4 mode (step n38), the update of the communication charge in the memory region corresponding to the G4 mode is accomplished in a likewise manner.

The control accumulating unit 43 may be implemented, in the communication charge updating, so as to read out the communication charge to be updated from the corresponding memory region in memory 41 for storing it into a register for example when communication mode specification information is applied and to enter a waiting state.

The communication mode specification information may be directly applied to control accumulating unit 43 from processing circuit 1a at the time of calling.

In either of the above embodiments, the constitution for storing a specific identification information and a communication charge in the memory may be easily implemented by making each address of the memory correspond with each identification information. In this case, the identification information code itself may be used as the memory address.

The read out of the contents of memory 41 is similar to that of the previous embodiments.

Although the communication charge is classified by the user code, the terminal unit specification code, or the communication mode code in the above embodiments, these embodiments may be applied in combination.

Thus, the communication charge is managed by identification information such as the user specification information, the terminal unit specification information, and the communication mode specification information, to allow accurate tracking of the communication charge for each item and monitor the communication charge efficiently.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital data communication network wherein communication charge data is transmitted to a calling side via a data communication line at the termination of communication, comprising:

a plurality of communication units, each unit comprising: a communication terminal coupled to said data communication line via a first line and having a unique subaddress allotted thereto and generating the subaddress when requesting communication, said subaddress including information indicating a mode of communication to be employed at the terminal; and identification means for generating an identification information from among a plurality of predetermined identification information at the time of calling from said communication terminal, said identification information defining an attribute of a calling side user;

first detection means coupled to said first line for detecting the communication charge data transmitted on said first line;

extracting means coupled to each of said communication terminals for extracting the subaddress generated by one of said communication terminals when a call is made therefrom;

storage means for individually storing the communication charge with respect to each of said plurality of predetermined identification information and each of said subaddresses indicating a communication mode of operation employed, in a combined manner;

second detecting means responsive to said generated identification information for detecting within said storage means the generated identification information; and updating means, responsive to said first and second detection means and to said extracting means, for updating the communication charge associated with the detected identification information and the communication charge associated with the extracted subaddresses in said storage means by the communication charge detected by said first detection means, said updating means including means for adding the detected communication charge to the corresponding communication charges stored in said storage means.

2. The digital data communication network of claim 1 wherein said updating means further comprises means for detecting coincidence/non-coincidence between the identification information from said identification means and said plurality of predetermined identification information stored in said storage means, and means for transmitting and error signal to said identification means in response to the detection of non-coincidence from said coincidence/non-coincidence detecting means.

3. A communication unit in a digital data communication network in which communication charge data is transmitted to a calling side via a data communication line at the time of termination of the communication, said data communication line being capable of transferring data in a mode selected among a plurality of communication modes each having different data bit transfer rate, and said communication charge being determined depending on a selected communication mode for the communication, comprising:

a communication terminal including a plurality of terminal units operable in differing communication modes, each terminal unit having a unique subaddress allotted thereto, and coupled to said data communication line via a first line;

first detection means coupled to said first line for detecting communication charge data transmitted on said first line;

generating means coupled to said first line and said communication terminal, for generating the unique subaddress allotted to a terminal unit requesting a calling in response to a call request from said terminal unit requesting the calling;

second detection means for detecting the subaddress from said generating means and the communication mode selected;

store means coupled to said first detection means and said second detection means for individually storing communication charge data for each respective subaddress; and updating means coupled to said first detection means, said second detection means and said storage means for updating the communication charge data corresponding to the subaddress thus detected and stored in said storage means by adding the communication charge data detected by said first detection means to the corresponding charge data stored in said storage means.

4. The communication unit of claim 3 further comprising identification means for inputting a user specification information from among a plurality of predetermined user specification information at the time of calling from said communication terminal;

means for detecting coincidence/non-coincidence between the user specification information from said identification means and the information stored in said store means; and means for transmitting an error signal to said identification means in response to the detection of non-coincidence from said coincidence/non-coincidence detection means.

5. A communication unit in a digital data communication network in which communication charge data is transmitted to a calling side via a data communication line at the time of termination of a communication, comprising:

a communication terminal coupled to said data communication line via a first line and capable of communication in a plurality of communication modes including communication modes having different data bit transfer rate;

first detection means coupled to said first line for detecting a communication charge data transmitted on said first line;

generating means coupled to said communication terminal for generating a mode identification data specifying a communication mode to be used in a requested communication upon a calling;

second detection means for detecting the mode identification data generated by said generating means;

storage means for individually storing communication charge data for each respective communication mode; and updating means coupled to said first detection means, said second detection means and said storage means, for updating communication charge data corresponding to the mode identification charge data detected by said first detection means to the corresponding communication charge data stored in said storage means.

6. The communication unit of claim 5 further comprising identification means for inputting a user specification information from among a plurality of predetermined user specification information at the time of calling from said communication terminal;

means for detecting coincidence/non-coincidence between the user specification information from said identification means and the information stored in said store means; and means for transmitting an error signal to said identification means in response to the detection of non-coincidence from said coincidence/non-coincidence detection means.

7. A communication method in a digital data communication network transmitting communication charge information to a calling side at the time of communication termination via a data communication line, said communication network comprising communication terminals coupled to said data communication line via a first line, said method comprising the steps of:

generated an identification information from among a plurality of predetermined identification information at the time of calling from one of said communication terminals;

generating a unique subaddress allotted to said one of said communication terminals at the time of calling, said subaddress including a mode of communication to be employed at said one of said communication terminals;

extracting the subaddress and the identification information;

detecting the communication charge information at the time of communication termination; and updating a stored content of a memory region corresponding to said identification information and a stored content of a memory region corresponding to the subaddress in response to said detected communication charge information and said extracted identification information and subaddress, said step of updating including the steps of accessing the corresponding memory regions and adding said detected communication charge to the stored content of the corresponding memory regions.

* * * * *